United States Patent
Lee et al.

(10) Patent No.: US 12,503,683 B2
(45) Date of Patent: Dec. 23, 2025

(54) POROUS GLUCOMANNAN SCAFFOLDS AND METHODS FOR PRODUCING THE SCAFFOLDS

(71) Applicants: C. Chang I. Lee, Davis, CA (US); Chan Ju Park, Gold River, CA (US); Justin Judd, Placerville, CA (US)

(72) Inventors: C. Chang I. Lee, Davis, CA (US); Chan Ju Park, Gold River, CA (US); Justin Judd, Placerville, CA (US)

(73) Assignee: Anemorix, LLC, Rancho Cordova, CA (US)

( * ) Notice: Subject to any disclaimer, the term of this patent is extended or adjusted under 35 U.S.C. 154(b) by 617 days.

(21) Appl. No.: 17/081,991

(22) Filed: Oct. 27, 2020

(65) Prior Publication Data

US 2021/0123014 A1    Apr. 29, 2021

Related U.S. Application Data

(60) Provisional application No. 62/927,207, filed on Oct. 29, 2019.

(51) Int. Cl.
| | |
|---|---|
| *C12N 5/00* | (2006.01) |
| *A61L 27/04* | (2006.01) |
| *A61L 27/12* | (2006.01) |
| *A61L 27/20* | (2006.01) |
| *A61L 27/50* | (2006.01) |

(Continued)

(52) U.S. Cl.
CPC .......... *C12N 5/0068* (2013.01); *A61L 27/047* (2013.01); *A61L 27/12* (2013.01); *A61L 27/20* (2013.01); *A61L 27/50* (2013.01); *A61L 27/54* (2013.01); *A61L 27/56* (2013.01);

(Continued)

(58) Field of Classification Search
None
See application file for complete search history.

(56) References Cited

U.S. PATENT DOCUMENTS 3,628,974 A * 12/1971 Battista .................. A23P 20/10
106/157.3
5,826,432 A * 10/1998 Ledbetter ................ F25D 25/00
62/196.4

(Continued)

FOREIGN PATENT DOCUMENTS

| | | |
|---|---|---|
| CN | 101322857 A | 12/2008 |
| CN | 102380128 A | 3/2012 |

(Continued)

OTHER PUBLICATIONS

Genevro et al., International Journal of Biological Macromolecules 128 (2019) 401-405 (Year: 2019).*

(Continued)

*Primary Examiner* — Evelyn Y Pyla
(74) *Attorney, Agent, or Firm* — DZ Buschmann Law

(57) ABSTRACT

The present invention provides methods of producing a glucomannan scaffold having uniform porosity and interconnectivity. The scaffold is prepared by maintaining a glucomannan gel under conditions prescribed to meet a length of time in the solidification phase. The method improves product consistency, while reducing manufacturing waste. The resulting glucomannan scaffold is capable of promoting cell growth and suitable for three-dimensional tissue culture and engineering.

15 Claims, 7 Drawing Sheets

(51) Int. Cl.
*A61L 27/54* (2006.01)
*A61L 27/56* (2006.01)

(52) U.S. Cl.
CPC ..... *A61L 2300/412* (2013.01); *A61L 2430/02* (2013.01); *C12N 2533/70* (2013.01)

(56) References Cited

U.S. PATENT DOCUMENTS

| | | | |
|---|---|---|---|
| 9,359,591 | B2 | 6/2016 | Lee |
| 9,926,528 | B2 | 3/2018 | Lee |
| 2005/0074877 | A1* | 4/2005 | Mao ............. A61L 27/3817 435/372 |
| 2005/0181058 | A1 | 8/2005 | Hefel |
| 2006/0147547 | A1 | 7/2006 | Yayon |
| 2012/0310366 | A1* | 12/2012 | Li ..................... A61K 33/42 623/23.57 |
| 2014/0315308 | A1 | 10/2014 | Lee |
| 2017/0224826 | A1 | 8/2017 | Gower |

FOREIGN PATENT DOCUMENTS

| | | |
|---|---|---|
| CN | 105056301 A | 11/2015 |
| CN | 104001211 B | 6/2016 |
| CN | 105664249 A | 6/2016 |
| CN | 107137770 A | 9/2017 |
| JP | H05161459 A | 6/1993 |
| WO | WO 1994/002029 A1 | 2/1994 |
| WO | WO 2004/067704 A2 | 8/2004 |
| WO | WO 2017/100878 A1 | 6/2017 |

OTHER PUBLICATIONS

Yang et al., International Journal of Molecular Sciences 2017, 18, 2250, 18 pages (Year: 2017).*
TA Instruments DSC 2920 Differential Scanning Calorimeter, 16 pages, retrieved from the internet (Feb. 10, 2025): https://www.tainstruments.com/pdf/literature/DSC_2920.pdf (Year: 2025).*
Alonso-Sande, et al., "Glucomannan, a promising polysaccharide for biopharmaceutical purposes," Eur J Pharm Biopharm., vol. 72, pp. 453-462 (2009).
Anderson, et al., "Biodegradation and biocompatibility of PLA and PLGA microspheres," Advanced Drug Delivery Reviews, vol. 28, pp. 5-24 (1997).
Ceonzo, et al., "Polyglycolic Acid-Induced Inflammation: Role of Hydrolysis and Resulting Complement Activation," Tissue Engineering, vol. 12, pp. 301-308 (2007).
Geiger, et al., "Collagen sponges for bone regeneration with rhBMP-2," Advanced Drug Delivery Reviews, vol. 55, pp. 1613-1629 (2003).
Glass, et al., "TNF—promotes fracture repair by augmenting the recruitment and differentiation of muscle-derived stromal cells," Proceedings of the National Academy of Sciences, vol. 108, pp. 1585-1590 (2011).
Gunnella, et al., "Low-dose BMP-2 is sufficient to enhance the bone formation induced by an injectable, PLGA fiber-reinforced, brushite-forming cement in a sheep defect model of lumbar osteopenia," The Spine Journal, vol. 17, pp. 1699-1711 (2017).
Koleva, et al., "Hyper-Crosslinked Carbohydrate Polymer for Repair of Critical-Sized Bone Defects," BioResearch Open Access, vol. 8, pp. 111-120 (2019).
Lykissas, et al., "Use of recombinant human bone morphogenetic protein-2 in spine surgery," World Journal of Orthopedics, vol. 8, pp. 531-535 (2017).
Mariner, et al., "Synthetic hydrogel scaffold is an effective vehicle for delivery of INFUSE (rhBMP2) to critical-sized calvaria bone defects in rats," Journal of Orthopaedic Research, vol. 31, pp. 401-406 (2012).
O'Brien, "Biomaterials & scaffolds for tissue engineering," Materials Today, vol. 14, pp. 88-95 (2011).
Ong, et al., "Off-Label Use of Bone Morphogenetic Proteins in the United States Using Administrative Data," Spine, vol. 35, pp. 1794-1800 (2010).
Robin, et al., "Cytokine-Mediated Inflammatory Reaction Following Posterior Cervical Decompression and Fusion Associated With Recombinant Human Bone Morphogenetic Protein-2," Spine, vol. 35, pp. 1350-1354 (2010).
Sandhu, et al., "Bone Morphogenetic Proteins and Spinal Surgery," Spine, vol. 28, pp. 64-73 (2003).
Shields, et al., "Adverse Effects Associated With High-Dose Recombinant Human Bone Morphogenetic Protein-2 Use in Anterior Cervical Spine Fusion," Spine, vol. 31, pp. 542-547 (2006).
Tannoury, et al., "Complications with the use of bone morphogenetic protein 2 (BMP-2) in spine surgery," The Spine Journal, vol. 14, pp. 552-559 (2014).
Wahab, et al., "Polysaccharides as Composite Biomaterials," Composites from Renewable and Sustainable Materials (2016).
Wang, et al., "Local Delivery of BMP-2 from Poly(lactic-co-glycolic acid) Microspheres Incorporated into Porous Nanofibrous Scaffold for Bone Tissue Regeneration," Journal of Biomedical Nanotechnology, vol. 13, pp. 1446-1456 (2017).
Winn, et al., "Carrier Systems for Bone Morphogenetic Proteins," Clinical Orthopaedics and Related Research, vol. 367, pp. 95-106 (1999).
Wong, et al., "Neurologic impairment from ectopic bone in the lumbar canal: a potential complication of off-label PLIF/TLIF use of bone morphogenetic protein (BMP-2)," The Spine Journal, vol. 8, pp. 1011-1018 (2008).
Wardhani et al. "Physicochemical Properties of Glucomannan-Alginate as Vitamin C Excipient," Evergreen, Jun. 1, 2018 (Jun. 1, 2018), vol. 5, Iss. 2, pp. 6-10.
International Search Report and Report on Patentability, WO2021/086862, Feb. 4, 2021.
Extended European Search Report for EP 20880610.9 dated Oct. 20, 2023.
Zhang, H. et al. (2013). Physically crosslinked hydrogels from polysaccharides prepared by freeze-thaw technique. Reactive and Functional Polymers, 73(7), 923-928.
Savina, Irina N., et al. "A simple method for the production of large vol. 3D macroporous hydrogels for advanced biotechnological, medical and environmental applications." Scientific reports 6.1 (2016): 21154.
Yang Kui. A Study on the MMT (Montmorillonite) Porous Materials Assembled by Ice-Templates and Related Heat-Mass Transfer Laws. Doctoral Dissertation of Chongqing University, published on May 15, 2013, Abstract.
Quinlan, Elaine, et al. "Long-term controlled delivery of rhBMP-2 from collagen-hydroxyapatite scaffolds for superior bone tissue regeneration." Journal of controlled release 207 (2015): 112-119.

* cited by examiner

POROUS GLUCOMANNAN SCAFFOLDS AND METHODS FOR PRODUCING THE SCAFFOLDS

CROSS REFERENCE TO RELATED APPLICATIONS

This application claims priority to U.S. Provisional Appl. No. 62/927,207 filed Oct. 29, 2019, which is incorporated by reference herein in its entirety.

BACKGROUND OF INVENTION

Tissue engineering requires functional cells, appropriate biochemical factors, and a biomaterial scaffold to regenerate, improve, replace, or repair damaged, diseased, or missing tissues and/or organs in an effort to improve clinical outcomes for patients. Tissue engineering can also be applied to developing biological constructs to study and screen toxins, drugs, proteins, and various compounds. While cells are the basic building block for generating tissues and biological constructs, the biomaterial scaffold plays a critical role in establishing a conducive environment to building tissues in vivo or in vitro.

Scaffolds can be constructed from naturally derived materials (e.g., carbohydrate- or protein-based biomaterials) or synthetic materials (e.g., polymer- or ceramic-based materials). The scaffold material should be biocompatible and biodegradable, and it should possess mechanical properties consistent with the tissue/site of interest. Scaffold architecture should also demonstrate adequate pore size and density to allow diffusion of cells and nutrients (O'Brien *Materials Today* 2011 14:88-95).

Carbohydrate-based biomaterials that have been used as tissue engineering scaffolds include, but are not limited to, alginate, chitosan, glycosaminoglycans, and hybrid composites. Glucomannan (GM) polymers are hyper-crosslinked to produce a highly porous, thermally stable, biocompatible, and biodegradable structure conducive to biological applications.

Carbohydrate-based scaffolds have also been used as carrier vehicles for osteoinductive factors such as recombinant human BMP-2. rhBMP-2 has been used for off-label anterior cervical discectomy and fusion (ACDF) procedures, but at concentrations far exceeding naturally occurring BMP-2 levels to compensate for leakage beyond implant site into adjacent tissues. Such leakage and high dose amounts are associated with adverse events. Thus, a carrier effective to localize BMP-2 at the implant site and to lower the effective dose is desirable.

The current method of producing glucomannan scaffold leads to structural collapsing and non-uniform porosity. This observation has not yet been studied, and to date, no efforts have been pursued to prevent structural collapsing or non-uniform porosity. Instead, portions of the scaffold construct with appropriate structure and porosity were simply selected and cut away from the remainder to provide an optimal structure for tissue engineering. The unselected, unsuitable parts of the scaffold construct were discarded, resulting in a significant amount of waste material and an increase in overall production cost. In addition, equipment and laboratory irregularities led to structural collapse and non-uniform porosity. Equipment variations (due to age, make, model, or configuration of the freezer), positional variations (due to the height or depth of the gel within the freezer), operational variations (due to power fluctuations or disruptions), and user variations (due to opening/accessing the freezer) all contributed to a discrepancy in temperature even within a single freezing system.

Thus, methods for improving characteristics of the scaffold are essential. A method of manufacturing porous glucomannan scaffold disclosed in the U.S. Pat. No. 9,359,591 leads to structural collapsing of the glucomannan scaffold. The present invention provides improved methods for obtaining a better outcome with structural characteristics of the glucomannan scaffold.

BRIEF SUMMARY OF THE INVENTION

It has been found that by controlling the variable of length of time in solidification phase, a uniformly porous and interconnected scaffold can be manufactured. In one embodiment, the present invention provides a method of preparing a glucomannan scaffold including freezing a glucomannan gel under conditions resulting in a solidification phase of about 10-2000 minutes, or in some embodiments, 50-1500 minutes. The method can include monitoring the temperature of the gel.

In another embodiment, the present invention provides a method of preparing a glucomannan scaffold including the steps of: a) cooling a glucomannan gel from a temperature of about 25° C. to a temperature of about 4° C.; b) maintaining the glucomannan gel in the solidification phase for at least about 10 minutes; c) thawing the glucomannan gel to a temperature of about 25° C.; d) optionally repeating steps a), b), and/or c). In some embodiments, the methods of manufacture include at least 1, 2, 3 or 4 freeze-thaw cycles.

The present invention also provides the scaffold resulting from the manufacturing processes described herein.

In another embodiment, the present invention provides a scaffold having a porosity of at least about 50% and/or an interconnectivity of at least about 50%. In one embodiment, porosity and/or interconnectivity are presented uniformly throughout the scaffold. In another embodiment, the volume of the scaffold having the described porosity and/or interconnectivity characteristics is at least 10% of the volume of the glucomannan gel. In one embodiment, the scaffold has a uniform pore size of about 100-500 µm.

In one embodiment, the methods of the present invention include a step of neutralizing the pH of the scaffold. Similarly, in one embodiment, the present invention provides a scaffold having a pH of about 7.

The scaffolds of the present invention have a backbone of at least 50% w/w carbohydrate mixture, and in some embodiments, at least 50% glucomannan. The backbone can comprise a composite. In some embodiments, the scaffold includes one or more bone consitutents (such as calcium and phosphate), and/or one or more morphogenetic proteins (such as BMP-2).

In another embodiment, the scaffold is radiolucent.

In another embodiment, the scaffolds can be used in experimental modeling as well as therapeutic applications. Such experimental and therapeutic uses include, but are not limited to neovascularization, orthopedics, cardiovascular, neuronal, would healing, hemostatic, drug screening and drug delivery, tissue regeneration, organoid, tissue (including soft tissue), and bone (re-)generation, dermatology, and dentistry.

BRIEF DESCRIPTION OF THE DRAWINGS

FIG. 3A shows a glucomannan scaffold being submerged in a colored dye. FIG. 3B shows the dye permeating the scaffold through the interconnected pores. FIG. 3C shows the scaffold completely saturated with the dye.

DETAILED DESCRIPTION OF THE INVENTION

I. Definitions

As used herein, the term "glucomannan" refers to a naturally-derived oligosaccharide composed of an approximately 1:1.6 ratio of β-1,4-linked D-glucose to D-mannose with branches approximately every 11 residues (Alonso-Sande et al. *Eur J Pharm Biopharm.* 2009 72:453-462) and derivatives thereof. Glucomannan has a backbone of approximately 5-10% substituted acetyl groups that participate in hydrogen bonding and hydrophobic interactions that confer solubility. Exemplary glucomannan derivatives include, but are not limited to, water-soluble derivatives such as O-alkyl derivatives and O-carboxyalkyl derivatives, derivatives with various degrees of substitution (without limiting, for example greater than or less than 5-10% substituted acetyl groups), derivatives with various degrees of oxidation, graft copolymers (without limiting for example, acrylate and acrylamide copolymers) and salts thereof (such as quaternary ammonium salts thereof).

As used herein, the term "glucomannan gel" refers to a thermally stable, homogeneous suspension of crosslinked carbohydrate). The glucomannan gel can be formed in a variety of ways including, but not limited, by hydrolysis of the acetyl groups of glucomannan in the presence of alkali.

As used herein, the term "glucomannan scaffold" refers to a three-dimensional porous matrix formed by sublimating a glucomannan gel. The glucomannan scaffold provides an environment suitable for cell culture and tissue engineering, including tissue regeneration.

The methods and compositions below are described with respect to glucomannan gels and glucomannan scaffolds as exemplary, but the invention can encompass gels and scaffold that are not entirely comprised or combined with glucomannan. Other naturally derived materials (e.g., carbohydrate- or protein-based biomaterials) or synthetic materials (e.g., polymer- and ceramic-based materials) may be included or combined in the gel and/or scaffold. In the embodiments of the present invention, the scaffold comprises at least about 50% (w/w) glucomannan, in some embodiments at least 60%, 70%, 80%, 90%, 95% glucomannan (w/w).

The "backbone" of the scaffold refers to the structural components that define and maintain the porous structure. The components that comprise the backbone of the scaffold are materials in the glucomannan gel formation. Additional components may be embedded to the backbone after the formation of the glucomannan scaffold, such that they are embedded on, but not integral to, the backbone. Furthermore, these components may be embedded in the backbone allowing slow and sustained release of components with degradation of the glucomannan scaffold over time in vivo.

Figure 1B:
FIG. 1B shows a GM scaffold produced using the current method described.
Figure 1A:
FIG. 1A shows a glucomannan scaffold produced using the prior art. It shows significant collapsing of the structure resulting in non-uniform porosity.
Figure 2:
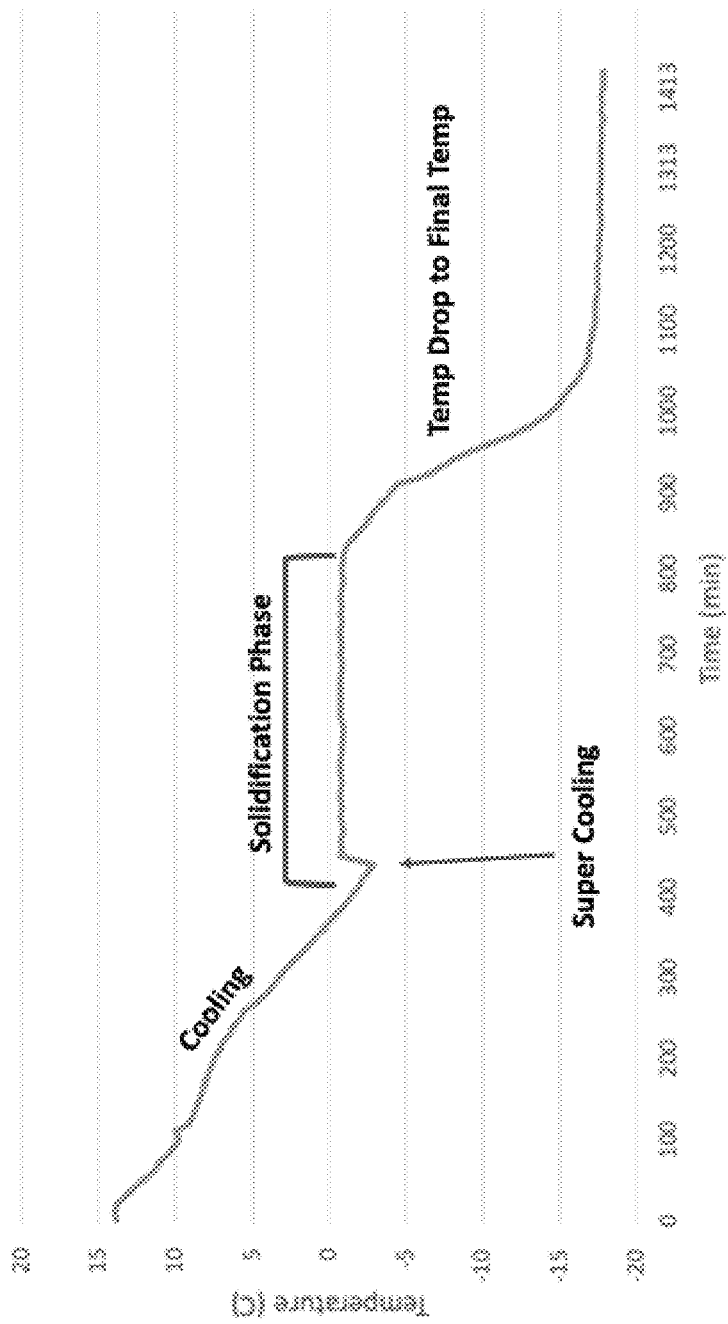
FIG. 2 shows the phase diagram of the glucomannan (GM) system. The temperature of the GM system is represented along the y-axis and the time on the x-axis. The GM gel first undergoes a change in temperature until reaching the temperature of freezing (cooling), followed by a period of constant temperature that we define as the length of time in solidification phase (LTSP). Supercooling may occur when the gel reaches a lower temperature than the freezing point. The SP is the phase in which all the liquid in the gel freezes forming ice crystals. The temperature then cools further to reach the final temperature of the system.

As used herein, the term "solidification phase" (SP) refers to the phase transition from liquid to solid. The solidification phase begins when the system (initially, a gel) first reaches the freezing point temperature, and it ends when the temperature of the (now a solid) system decreases below the freezing point temperature. The "length of time in solidification phase" (LTSP) is the time during which the system remains at an approximately constant temperature during the freezing phase transition. If the system exhibits a supercooling phase, the solidification phase includes the supercooling phase. That is, the length of time in solidification phase begins at the time the system first reaches the freezing point temperature and ends only after the phase transition is completed. For the glucomannan gel compositions of the present invention, the freezing point is in the range of $-0.01°$ C. to $-3.00°$ C. (slightly below $0°$ C., the freezing point of water). Thus, for a gel consisting of glucomannan as the backbone carbohydrate, the solidification phase will present graphically as a plateau at about $-0.8°$ C. See FIG. 2.

As used herein, the term "freezing conditions" refers to subjecting the glucomannan system to a temperature at or below 0° C. to induce and maintain the SP to achieve uniform porosity. Freezing conditions include temperatures in the range of −80 to −20° C., −20 to −10° C., −10 to −5° C., −5 to 0° C., or a gradual temperature reduction range using a controlled rate freezing protocol. In one embodiment, freezing conditions include temperatures at or below −0.33° C.

The term "thawing conditions" means subjecting the glucomannan system to a temperature above 0° C. Thawing conditions include temperatures of 0° C. to 5° C., 0° C. to 10° C., 0° C. to 20° C., room temperature conditions (20° C. to 25° C., or about 23° C.), or temperatures above 25° C.

As used herein, "controlled rate" conditions refer to subjecting the system to a pre-selected rate of temperature change (e.g., in a laboratory grade, controlled rate freezer) to induce and maintain the SP. In contrast, "constant temperature" conditions mean that the system is subjected to a constant, pre-selected temperature. In both cases, "controlled rate" and "constant temperature" freezing conditions refer to the temperature settings of the equipment (e.g., freezer) and/or environment (physical, chemical), not the temperature of the glucomannan system, which can be separately monitored and recorded (i.e., to measure the length of time in solidification phase).

As used herein, one "freeze-thaw cycle" is a two-part step wherein a glucomannan system at or below the glucomannan freezing point (i.e., a frozen or partially frozen glucomannan system) is subsequently a) subjected to thawing conditions, i.e., a temperature above the freezing point of the glucomannan system, and then 2) re-subjected to freezing conditions. In each freeze-thaw cycle, the thawing conditions and/or the freezing conditions may be the same as, or different from or a combination of the, previous thawing or freezing conditions. Each thawing step and each freezing step may be independently selected from controlled rate and constant temperature conditions.

As used herein, porosity means at least 50% ratio of volume of pores to the total volume of the glucomannan scaffold as measured by mercury intrusion porosimetry testing. In some embodiments, the porosity may be at least 50%, 60%, 70%, or 80%. Furthermore, a "uniform" porosity is achieved when the scaffold presents a porosity that is consistent throughout (e.g., from periphery to center) after preparation from the gel. The previous method of manufacturing porous glucomannan scaffold (U.S. Pat. No. 9,359,591) subjects the glucomannan gel into a specific temperature to prompt freezing. However, this method yields structural collapsing and non-uniform porosity in the scaffold. Instead, the present invention discloses that controlling different and multiple variables—SP—would yield more accurate and consistent results. More specifically, adjusting the LTSP would yield improved product outcome.

Figure 3:
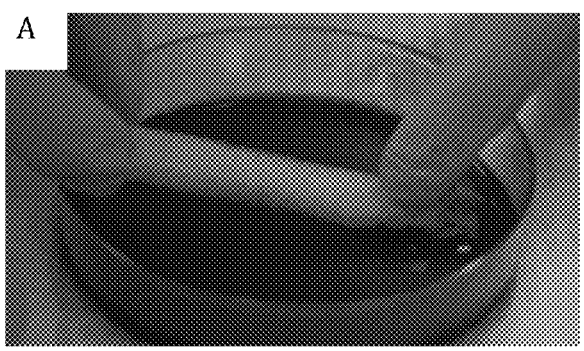
FIG. 3 shows the highly porous glucomannan scaffold with interconnected pores.
Figure 3:
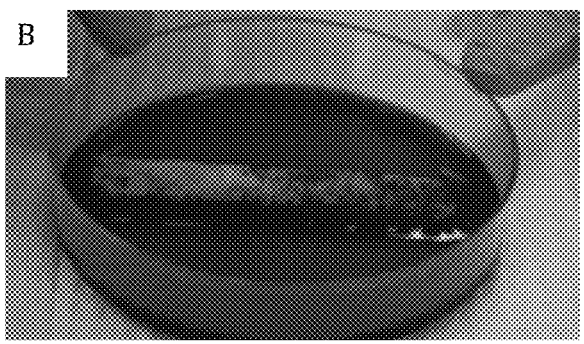
Figure 3:
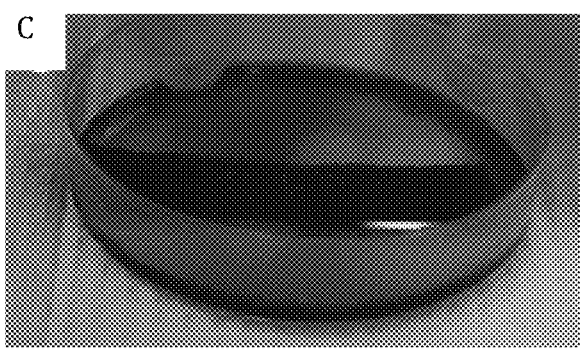

As used herein, "interconnected" pores refer to a network of pores that are permeable and allow the flow of matter from one pore to another (FIG. 3). In some embodiments, the interconnectivity can be at least 50%, 60%, 70%, 80%, 90%, 95%, or 99% of the scaffold. Interconnectivity can be measured by a dye permeation study as described by FIG. 3. Furthermore, a "uniform" interconnectivity is achieved when the scaffold presents interconnectivity that is consistent throughout (e.g., from periphery to center) after preparation from the gel.

Interconnected pores are important for cellular infiltration, introduction of nutrients and removal of waste, and flow of cellular signaling factors. Interconnected pores present a unique opportunity for establishing new vasculature within a newly formed tissue throughout the scaffold/tissue construct. Typically, in a clinical setting, the size of tissue defect or injury, which requires regeneration, may extend beyond the capability of nutrient delivery or waste removal by diffusion. Thus, neovascularization is necessary, not just in the periphery of the scaffold/tissue construct but throughout the entirety of the newly formed tissue to prevent cellular apoptosis and subsequent necrosis. Therefore, in addition to high porosity, interconnectivity within the scaffold is crucial for successful tissue engineering and regeneration. Also, in the case of blood coagulation, insufficient infiltration of blood components that participate in coagulation may result in continuous bleeding. A highly porous scaffold that contains interconnected pores may be used as a hemostatic device, wherein fibrin fibers (or aggregation of platelets) are crosslinked/formed throughout the entirety of the scaffold. This may provide a stable blood clot that is useful for hemostasis. In addition, such scaffold may be used in a tooth extraction socket without the need to place sutures, which would prevent the scaffold from falling out of the socket ("dry socket"), due to blood clot forming throughout the scaffold construct. This approach may provide a convenient placement of the scaffold in a tooth extraction socket by a dentist without sending the patient to oral surgery.

In one embodiment, the initial volume of the glucomannan gel, before being subjected to any freezing conditions, can be within the range of 100-5000 mL, 250-2500 mL, 100-1000 mL, or about 450 mL. For example, in one embodiment, the initial gel is in a cylindrical shape having dimensions of 1-5 cm in thickness and 10-20 cm in diameter. In other shapes, configurations, and dimensions, the initial gel volume can be the same as or different from the exemplary cylindrical volume and dimensions. The present inventors have discovered that by monitoring the LTSP, suitable freezing conditions can be adapted to a variety of gel shapes and dimension for versatile tissue engineering applications. For example, the initial gel can be poured into any structure or the resulting scaffold can be cut into various shapes, including cubes, sheets cylinders, tubules, or tori (ring-shaped). In a specific embodiment, the cylindrical diameter ranges described above, the surface area to volume ratio (SA:V) is within a range of 0.5 to 2.5, 0.6 to 2.4, or 0.75 to 1/cm. In one specific embodiment, the SA:V ratio is 0.8 to 0.9/cm.

The yield is measured as the percentage volume of initial glucomannan gel that converts to a glucomannan scaffold with a uniform porosity of at least 50%. The yield measurement excludes solidified glucomannan that does not fall within the prescribed porosity range (which, by previous methods, was cut away from the scaffold product and discarded as manufacturing waste). In the present invention, the method yields at least 10%, at least 25%, at least 35%, or preferably at least 50% or above of suitably porous scaffold from initial gel material.

II. Solidification Phase

The present invention provides an improved glucomannan scaffold. The glucomannan scaffold of the present invention is suitable for use as a three-dimensional cell culture and tissue engineering or organoids. The glucomannan scaffold provides a highly porous structure and pore size suitable for culturing cells. Moreover, the scaffold is homogenous, thermally stable, elastic, biocompatible and biodegradable, and can be made into any shape and size suitable for 3D tissue culture and engineering, organoids by, for example, molding or cutting.

According to manufacturing techniques disclosed in the U.S. Pat. No. 9,359,591, the glucomannan gel was frozen by placing the glucomannan gels were placed in culture dishes and then frozen in a blast freezer for 30 min at less than or equal to −50° C. See U.S. Pat. No. 9,359,591. In contrast, freezing temperature or freezing rate of the improved present methods provides a specific LTSP to produce a glucomannan scaffold with uniform porosity. In one embodiment, the glucomannan gel is at a temperature of less than 50° C. when the freezing step is commenced. In some embodiments, the glucomannan gel is at a temperature greater than 0° C. and less than: 40° C., 35° C., 30° C., 25° C., 10° C., or 5° C. In one embodiment, the glucomannan gel is at about room temperature (20° C. to 25° C., or about 23° C.) when the freezing step is commenced. In another embodiment, the glucomannan is at about 4° C. when the freezing step is commenced.

In one embodiment, the method includes freezing a glucomannan gel, wherein the freezing conditions result in a LTSP of about 10-2000 minutes. In some embodiments, the LTSP is at least about 10-30, 60, 100, 200, 270, 280, 300, 350, 360, 375, 400, 425, 440, 450, 460, 470, 475, 480, 490, 500, 525, 550, or 600 minutes. In some embodiments, the LTSP is about 10-60 minutes, 250-2000 minutes, 250-1500 minutes, 250-1000 minutes, 250-750 minutes, 500-1500 minutes, 500-1000 minutes, 250-750 minutes, 400-500 minutes, or 450-500 minutes.

In one embodiment, the SP includes a supercooling phase. In this instance, the LTSP begins at the time the system first reaches the freezing point temperature (e.g., about −0.8° C.), it includes the supercooling peak below the freezing temperature, it continues through the plateau at about freezing temperature, and ends only after the system begins its descent toward the final freezing temperature or environmental freezing temperature (e.g., freezer temperature).

In another embodiment, a supercooling phase does not occur. In this instance, the LTSP begins at the time the system first reaches the freezing point temperature (e.g., about −0.8° C.); it continues through the plateau at about freezing temperature, and ends when the system begins its descent toward the final freezing temperature or environmental freezing temperature (e.g., freezer temperature).

In some embodiments, the method includes monitoring the temperature of the glucomannan system during one or more freezing steps. The temperature can be monitored by inserting a temperature probe (e.g., Cooper Atkins Digital Thermometer, LCD, Immersion Probe model DTT361-01) to measure the internal temperature of the glucomannan system. In one embodiment, the laboratory temperature probe can remotely report and/or record the temperature changes of the glucomannan system within the freezer. Monitoring the temperature can help define prescribed freezing conditions for a predetermined glucomannan gel volume and/or dimension. It may also be useful to account for equipment and laboratory irregularities. Monitoring the temperature allows the user to achieve the desirable LTSP while taking into account equipment variations (due to age, make, model, or configuration of the freezer), positional variations (due to the height or depth of the gel within the freezer), operational variations (due to power fluctuations or disruptions), and user variations (due to opening/accessing the freezer).

The LTSP parameters can be achieved by subjecting the glucomannan system to freezing conditions that include a controlled rate temperature decrease and/or a constant temperature. In some embodiments, the freezing conditions include a controlled rate temperature decrease. The controlled rate temperature decrease is achieved by using a laboratory, food, clinical-grade controlled rate freezer. The ending temperature for the controlled rate freezing step conditions can be selected from temperatures at or below 0° C., such as temperatures of about −78° C. to −20° C., −20° C. to −10° C., −10° C. to −5° C., or −5° C. to 0° C.

In some embodiments, the controlled rate is about −0.05° C./min to −1° C./min, −0.1 to −10° C./min −0.5° C./min to −0.005° C./min, −0.05° C./min to −0.005° C./min, or −0.06° C./min to −0.04° C./min. In one embodiment, the controlled rate is about −0.05° C./min.

In some embodiments, the freezing conditions include exposure to a constant temperature. Constant temperature freezing conditions include any temperature at or below about 0° C. Constant temperature freezing conditions include temperatures of about −78 to −20° C., −20 to −10° C., −10 to −5° C., −5 to −1° C. The duration of exposure can be at or greater than about 5 min, 15 min, 30 min, 1 hr, 2 hr, 2.5 hr, 3 hr, 4 hr, or 5 hr. In some embodiments the duration of exposure at constant freezing temperature is about 1-5 hours. In other embodiments, the duration of exposure can be at least about 5, 8, 10, 12, or 24 hours.

In another embodiment, the freezing conditions include both controlled rate periods and constant temperature periods. In one embodiment, the freezing conditions include a controlled rate period followed by a constant temperature period.

III. Cyclical Freeze-Thaw

In some embodiments, the method includes one or more freeze-thaw cycles. A freeze-thaw cycle is when a glucomannan system at a temperature at or below about 0° C. to induce, adjust, and maintain the SP, is subjected to thawing conditions, and then re-subjected to freezing conditions (which may be the same as or different from or a combination of one or more previous freezing steps). The method can include 0, 1, 2, 3, 4 or more freeze-thaw cycles. In one embodiment, the method includes one freeze-thaw cycle.

"Thawing conditions" include temperatures of about 0° C. to 5° C., 0° C. to 10° C., 0° C. to 20° C., room temperature conditions (about 20° C. to 25° C., or about 23° C.), or temperatures above about 25° C. In one embodiment, thawing conditions bring the glucomannan system to a temperature at about room temperature.

When the thawing step brings the glucomannan system to a temperature above 0° C., the next cycle may include an intermediate cooling step before the subsequent freezing step. For example, in some embodiments, the thawing step includes warming (e.g., allowing to warm at room temperature) the glucomannan system from a temperature below about 0° C. to a temperature above about 0° C., 5° C., 10° C., 25° C., 30° C., or 35° C. Then the thawed glucomannan system is subjected to a cooling step, wherein the system temperature is decreased to a temperature below the thawed temperature, but greater than about 0° C., such as for example, about 4° C. Then the glucomannan system is subjected to a freezing step as previously described. Similar to the freezing conditions, the thawing and/or cooling conditions can be achieved by controlled rate and/or constant temperature conditions.

IV. Glucomannan Gel Formation

The methods of the invention can include various additional steps. In some embodiments, the method further includes forming a reaction mixture including carbohydrate mixture (with at least about 50% (w/w) glucomannan), an alkaline solution, and water; and heating the reaction mixture at a temperature of about 50° C. to about 130° C. to form a glucomannan gel and/or increasing the pressure of the glucomannan gel to about 0.1 psi to 50 psi above atmospheric pressure to form a glucomannan gel.

The glucomannan gel used in the method of the present invention is a mixture of a carbohydrate mixture (with at least about 50% (w/w) glucomannan) and an aqueous solution. The glucomannan can be provided as glucomannan powder. In some embodiments, glucomannan powder is dissolved in water to provide a glucomannan solution containing from about 1% to about 5% w/v glucomannan in water. The glucomannan powder can be dissolved in the aqueous solution at any appropriate temperature and pressure conditions. Examples of carbohydrates that may be included are without limiting, alginate, chitosan, starch, plant or bacterial-based polysaccharides.

To induce the glucomannan gel to the SP, the method can include cooling the reaction mixture (previously heated to facilitate dissolution), and then subsequently subjecting the GM gel to a freezing system. In some embodiments, the temperature of the glucomannan gel is cooled to less than about 80° C. before subjecting the GM gel to a freezing system to maintain the SP, as described herein. In certain embodiments, the temperature of the glucomannan gel is cooled to less than about 50° C. before subjecting the GM gel to a freezing system. The cooling step can be performed in a controlled rate or constant temperature manner. In one embodiment, the cooling step is performed by returning the heated glucomannan mixture to room temperature.

The aqueous solution can have any suitable composition. The aqueous solution can be water or a mixture of water and one or more agents that do not degrade or digest the neutralized glucomannan system. Examples of suitable aqueous solution include, but are not limited to, water, a buffered solution, and a cell culture medium.

In one embodiment, the aqueous solution is a buffered solution. Examples of suitable buffered solutions include, but are not limited to, PBS, TAPS, BIS-TRIS propane, TRIS, HEPES, TES, MOPS, PIPES and IVIES. In some embodiments, the buffered solution is PBS, HEPES, IVIES, MOPS, TRIS or BIS-TRIS Propane. In preferred embodiments, the buffered solution is PBS.

In another embodiment, the aqueous solution is a cell culture medium. Examples of suitable cell culture media include, but are not limited to, Roswell Park Memorial Institute medium (RPMI), Dulbecco's Modified Eagle Medium (DMEM), Minimum Essential Medium (MEM), Dulbecco's Modified Eagle Medium: Nutrient Mixture F-12 medium (DMEM/F12), Iscove's Modified Dulbecco's Medium (IMDM), a National Collection of Type Cultures medium (NCTC) and Osteogenic Induction Medium (OIM). In some embodiments, the cell culture medium is Roswell Park Memorial Institute medium (RPMI), Dulbecco's Modified Eagle Medium (DMEM), Minimum Essential Medium (MEM), Dulbecco's Modified Eagle Medium: Nutrient Mixture F-12 medium (DMEM/F12), Iscove's Modified Dulbecco's Medium (IMDM) or a National Collection of Type Cultures medium (NCTC).

In another embodiment, the glucomannan gel can include an acidic solution. Examples of suitable acidic solutions include, but are not limited to, hydrochloric acid, acetic acid, tartaric acid, malic acid and citric acid.

In another embodiment, the glucomannan gel can include an alkaline solution. The alkaline solution can be any solution containing the salt of an alkali metal or alkaline earth metal. Representative salts of alkali and alkali earth metals include, but are not limited to, sodium hydroxide, sodium carbonate, potassium hydroxide, potassium carbonate, magnesium hydroxide, magnesium carbonate, calcium hydroxide and calcium carbonate. In some embodiments, the alkaline solution comprises calcium hydroxide.

V. Glucomannan Scaffold Preparation and Modifications

The glucomannan scaffold of the present invention can be basic (having a pH of greater than about 8), or it can be neutralized (having a pH of about 7) according to the methods described in U.S. Pat. No. 9,359,591, which is incorporated by reference in its entirety.

The glucomannan scaffold of the present invention can be subsequently sterilized by autoclaving, making it useful for implantation and other in vivo applications.

In some embodiments, the method further comprises removing the water from the glucomannan system. The water can be removed by any suitable method known in the art. In some embodiments, the removing step is performed by freeze-drying, sublimation, or thermally-induced phase separation work. In certain embodiments, the removing step is performed by sublimation.

In one aspect of the present invention, the glucomannan scaffold includes one or more bone constituents. Bone constituents are defined as any substance that contributes to osteogenesis, or the formation of bone. Bone constituents include, but are not limited to, organic components such as extracellular and/or bone matrices or ground bone, and inorganic components such as calcium, phosphate, potassium, magnesium, and hydroxyapatite. In one embodiment, the scaffold includes calcium and/or phosphate as a bone constituent. In another embodiment, the scaffold includes calcium. The bone constituent(s) is integrally incorporated to the backbone of the scaffold. The total concentration of bone constituents with respect to the glucomannan system is in a range of about 0.1 to 95% (w/w). For example, the scaffold can be manufactured with 1-20%, 1-10%, or about 5% CaOH: glucomannan powder (w/w).

This concentration is desirably advantageous because it renders the scaffold radiolucent. At higher concentrations, the scaffold will be radioopaque, thereby hindering the visualization and monitoring of stem cell adherence and bone formation. At lower concentrations, the scaffold is less effective in generating new bone formation. Most products available in the orthopedic market are radiopaque, which means that these products may show a radiographical density similar to a developing or mature bone even when there is no osteogenesis occurring. Thus, a radiolucent product would provide the ability for surgeons, doctors, and patients to visualize and monitor bone regeneration radiographically over time. CT provides excellent resolution of trabecular and cortical bone and a quantitative method of Hounsfield unit (HU) to evaluate mineral density. HU, which is a standard linear attenuation coefficient of tissue, readily provides information regarding bone quantity. Typically, the HU value for bone ranges from 300 to 3,000. Thus, "radiolucency" for bone application is defined as HU below 300. Consistent with this observation, the scaffold of this invention measures HU of less than 300 and provides a unique way to monitor and quantify bone repair and regeneration starting with HU of below 300 at baseline and increase in HU over time as the bone repair and regeneration processes occur.

In another aspect of the present invention, the glucomannan gel and/or the glucomannan scaffold is modified to promote cell adhesion and proliferation. Exemplary modifications include, but are not limited to, incorporation of a cell adhesion promoter, chemical crosslinking, surface coating, and introduction of functional groups. All such molecules and structures known in the art are encompassed within the disclosure of the present invention.

The glucomannan scaffold of the present invention can include one or more cell adhesion promoters. As used herein, the term "cell adhesion promoter" refers to a natural or synthetic agent that enhances the adhesion or attachment of cells to a culture substrate, for example, by modifying the surface of the substrate, and/or by altering the surface charge. The cell adhesion promoter can also promote cell growth and cell differentiation. A cell adhesion promoter may also enhance the adsorption of serum or extracellular matrix proteins to the culture substrate. In some embodiments, the cell adhesion promoter can be poly-L-lysine (PLL), poly-D-lysine (PDL), RGD peptide (RGD), KQAGDV, VAPG, FGL, amine groups, fibronectin, elastin, collagen or laminin. The extracellular matrix proteins can be from any suitable source, including, but not limited to, mammalian cells. In some embodiments, the cell adhesion promoter is PLL or RGD. In certain embodiments, the cell adhesion promoter is PLL.

In another embodiment, the glucomannan scaffold includes a suitable chemotactic molecule. Exemplary chemotactic molecules include, but are not limited to, serum, chemokines, morphogenetic proteins, growth factors, hyaluronan. In one embodiment, the glucomannan scaffold includes one or more bone morphogenetic proteins. Bone morphogenetic proteins include, but are not limited to, BMP-1, BMP-2, BMP-3, BMP-4, BMP-5, BMP-6, BMP-7, BMP-8a, BMP-8b, BMP-9, BMP-10, BMP-11, BMP-12, BMP-13, BMP-14, BMP-15. In one embodiment, the scaffold includes BMP-2. The BMPs can be recombinant or naturally derived. The ratio of the concentration of bone morphogenetic protein solution in the scaffold is about 0.001 to 1.5 mg/mL.

The scaffold may include other osteoinductive factors such as fibroblast growth factor-2 (FGF-2), and/or platelet-derived growth factor (PDGF). In humans, BMP-2 concentrations measured in fractured bone supernatants are about 23.2 pg/mL (Glass et al. *Proceedings of the National Academy of Sciences* 2011 108:1585-1590). However, recombinant human BMP-2 (rhBMP-2) is delivered clinically at a dose of 1.5 mg/mL, significantly higher than the natural concentration of BMP-2 following injury. rhBMP-2 was used for off-label anterior cervical discectomy and fusion (ACDF) procedures at a concentration up to 2.5 mg/level, 3.5 times the amounts used in pilot studies (Shields et al. *Spine* 2006 31:542-547). This higher dosage was associated with increased complications including hematomas, neck swelling, dysphagia, and excessive edema (Shields et al. *Spine* 2006 31:542-547). Other adverse events traced to high doses of rhBMP-2 include swallowing difficulties and abnormal adipose tissue formation (Shields et al. *Spine* 2006 31:542-547). While the use of BMP-2 has increased in popularity, 85% of its usage between 2003 and 2007 was off-label (Ong et al. *Spine* 2010 35:1794-1800). This has resulted in BMP-2 receiving significant attention for the complications stemming from the high clinical dosages (Lykissas et al. *World Journal of Orthopedics* 2017 8:531-555). In addition, it is important to localize rhBMP-2 to the site of injury for osteogenic precursors to proliferate and differentiate into mature bone cells (Sandhu et al. *Spine* 2003 28:64-73) without leaking into adjacent tissues. However, rhBMP-2 has been shown to result in unintended side effects in the surrounding areas when its effects extend outside of the target area, resulting in ectopic bone formation in addition to the side effects listed above (Tannoury et al. *The Spine Journal* 2014 14:552-559, Shields et al. *Spine* 2006 31:542-547). A common commercial carrier for rhBMP-2 is an absorbable collagen sponge (ACS). While ACS had been shown to be an effective carrier for rhBMP-2, the fast release rate, possibly caused by collagen degradation, requires rhBMP-2 to be implanted at a high concentration to deliver an effective dose, which further increases the risk of complications (Mariner et al. *Journal of Orthopaedic Research* 2012 31:401-406, Winn et al. *Clinical Orthopaedics and Related Research* 1999 367:95-106). Thus, a carrier effective to localize rhBMP-2 at the implant site and to lower the effective dose is desirable.

In another embodiment, the glucomannan scaffold includes a suitable cell signaling molecule. Exemplary cell signaling molecules include, but are not limited to, extracellular matrix proteins, peptide motifs and growth factors and others known in the art.

VI. Methods of Use

The scaffolds of the present invention can be used in various in vitro and in vivo methods. The scaffolds can be used in experimental modeling as well as therapeutic applications. Such experimental and therapeutic uses include, but are not limited to neovascularization, orthopedics, cardiovascular, neuronal, would healing, hemostatic, drug screening and drug delivery, tissue regeneration, organoid, tissue (including soft tissue), and bone (re-)generation, dermatology, and dentistry.

In some embodiments, the methods further comprise growing cells on the glucomannan scaffold. Suitable cell types and culture conditions are known in the art.

EXAMPLES

Example 1

Freeze/Thaw Cycles

Glucomannan powder (1-5 grams) was dissolved in 100 mL of water in a beaker with 0.15 gram of calcium hydroxide (Sigma-Aldrich, St. Louis, MO, USA), mixed thoroughly, and incubated at room temperature for 30 minutes. The beaker containing GM solution was covered with aluminum foil and incubated in a water bath maintained at a temperature above 80° C. for at least 30 minutes. After cooling to room temperature, the resulting GM gel was cut into smaller gels and soaked in water overnight at room temperature.

To produce a porous glucomannan scaffold with structural consistency and uniform porosity, the glucomannan gel was placed on a metal mesh in a variable temperature chamber. The temperature in the chamber was lowered from room temperature to 4° C. at −0.05° C./min. Once the temperature reached 4° C., the gels were allowed to incubate for 1-5 hours. Subsequently, the temperature was lowered again to −20° C. at −0.05° C./min and maintained at −20° C. for 5 hours. The glucomannan gel was subjected to these specific temperatures and times to ensure the LTSP was within range to produce structural consistency and uniform porosity. After 5 hours, the glucomannan gel was thawed to room temperature in water at 25° C./min for 3-7 hours or until completely thawed. Water was squeezed out prior to the next temperature cycle. In this example, this temperature cycling was performed four times.

After the last cycle, water was sublimated with the shelf temperature reaching 120° C. for up to 72 hrs, and the vacuum was maintained at 100-300 millitorr (13 to 40 Pa). After the drying cycle, the glucomannan scaffold was neutralized by boiling in phosphate buffered saline (pH 7.4) in a pressurized chamber for 30 minutes, followed by two cycles of washing and boiling in distilled water in the pressurized chamber for 30 minutes each. After the last wash, water was sublimated from the glucomannan scaffold as described above. The resulting porous GM product was cut to customized shapes and sizes, packed in polyethylene bags containing desiccant, sealed, and stored at room temperature until use.

Example 2

Length of Time in Solidification Phase

Glucomannan gels were made using the same method as Example 1. After the glucomannan gel was produced, it was placed in a constant temperature freezer at a selected temperature (e.g., −78° C., −20° C., −10° C., −5° C., and −1° C.). To determine the LTSP, the temperature of the gels was measured. To obtain the temperature of the gel, a temperature probe (Cooper Atkins Digital Thermometer, LCD, Immersion Probe) was placed into the center of the gel. The temperature was then taken at select intervals (e.g., 30 seconds, 1 minute, 5 minutes, 10 minutes) and graphed.

Example 3

Induction of Osteogenesis by Hyper-Crosslinked Carbohydrate Polymer with Calcium We investigated the property of bone graft substitute OSTEO-P® BGS with calcium to induce osteogenesis. Compared to orthotopic bone formation (i.e., osteogenesis adjacent to existing bone), a study on ectopic bone formation investigates the ability of a test article to form bone in the absence of appropriate biochemical, biomechanical, and bone forming or endogenous stem cells. Thus, it eliminates potential extraneous experimental variables associated with the induction of osteogenesis, enabling researchers to investigate the ability of the test article to induce bone formation. In this ongoing study, a well-characterized rat model is utilized to study whether HCCP plus the bone constituent calcium could induce osteogenesis when implanted subcutaneously in an avascular environment.

Materials and Methods

Rats (Wistar IGS Male Rats, Charles River, Wilmington, MA) were implanted with HCCP with calcium integrated into the microstructure of the pores (HCCP-Ca, N=6) or control HCCP construct with sodium (HCCP-Na ["Control"], N=6) subcutaneously at an avascular location at least 1 cm away from the incision site to avoid possible mixing with blood. CT images were taken at baseline and weekly until implant harvest at 1 month post-implantation. Each implant was collected and processed for histology (hematoxylin and eosin staining), immunohistochemistry (IHC), and von Kossa staining.

CT Findings

CT images showed an increase in the level of radiodensity at the site of implantation at 4 weeks compared to baseline. A quantitative assessment of Hounsfield units (HU), indicative of ossification, is used to compare HCCP-Ca to control at all time points. As a comparison, the amount of HU observed at 4 weeks post-implantation was equivalent to that of developing fetal bone during the second trimester.

Gross and Histological Findings

Implants were harvested, and gross imaging was performed. HCCP-Ca showed an evidence of neovascularization, containing fresh blood. However, limited neovascularization was observed with the control construct. Consistent with the gross findings, a histological evaluation also revealed infiltration of newly formed blood vessels into HCCP-Ca, and the control construct showed a limited amount of blood vessels. Notably, the control construct was observed with more cells exhibiting fibroblastic morphology, whereas HCCP-Ca was observed with cells showing morphology resembling osteoblasts. Additional sections showed some morphological differences between the control construct and HCCP-Ca.

IHC and Von Kossa Findings

Implants were further evaluated for the expression of bone sialoprotein (BSP), which is a significant component of mineralized tissues such as bone, by IHC. Numerous cells expressing BSP were observed in HCCP-Ca evidenced by red staining. All other conditions (assay controls, control construct) showed background staining, exhibiting characteristically different staining pattern. Von Kossa staining is intended for use in the histological visualization of calcium deposits. Consistent with all other findings (CT, histology, IHC), von Kossa staining showed minimal signal in the control construct whereas HCCP-Ca showed an evidence of calcium deposition.

Conclusions

The results of these studies indicate that HCCP-Ca is observed with: (1) an increased level of radiodensity similar to the bone density observed in bone (most likely close to cancellous bone, rib bone) of a developing fetus during the second trimester based on CT observations; (2) an evidence of neovascularization when implanted in an avascular environment; (3) expression of bone sialoprotein in the cytoplasm of cells that infiltrate into the product; and (4) von Kossa staining in cells residing in the product when implanted subcutaneously in rats.

Example 4

Binding Affinity of Hyper-Crosslinked Carbohydrate Polymer to Bone Morphogenic Protein-2

Hyper-crosslinked carbohydrate polymer (HCCP) has been shown to bridge and repair a critical-sized bone defect effectively. This study was conducted to investigate the interaction between HCCP and recombinant and endogenous bone morphogenic protein-2 (BMP-2) in vitro and in vivo. HCCP was incubated in a buffer solution and bone marrow spiked with recombinant human BMP-2 (rhBMP-2), washed extensively, and assessed for BMP-2 binding affinity using qualitative and quantitative immune-based assays. HCCP was also implanted in a critical-sized defect in the femoral condyle of New Zealand White rabbits to correlate in vitro and in vivo findings. Results indicated that rhBMP-2 could bind to and be retained in HCCP evidenced by antibody staining and ELISA findings. HCCP implanted in a critical-sized bone defect revealed the localization of endogenous BMP-2 to the surface of HCCP structures surrounded by cells expressing BMP-2. These findings suggest that the binding affinity of HCCP to BMP-2 may play an important role in the repair and bridging of a critical-sized bone defect and support HCCP as a new carrier of rhBMP-2. This study supports the hypothesis that the binding affinity of hyper-crosslinked carbohydrate polymer (HCCP) to BMP-2 plays a key role in early osteogenesis in a critical-sized bone defect. This study also presents evidence that HCCP may be a suitable alternative to ACS. HCCP has exhibited a degradation profile averaging 16 weeks, compared to ACS's 2-4 weeks, when investigated as a bone graft substitute for the repair of a critical size defect in the rabbit femoral condyle, which resulted in significant regeneration of bone. Thus, the binding affinity of HCCP to rhBMP-2 and endogenous BMP-2 may provide a valuable means to establish early osteogenesis at the implant site and present an evidence for its clinical utilization as a new carrier.

Materials and Methods

Characterization and preparation of HCCP: HCCP comprises of carbohydrate chains crosslinked synthetically. HCCP has demonstrated to be biocompatible with no pyrogenicity, immunogenicity, cellular toxicity, or carcinogenicity in in vivo and in vitro investigations. The microarchitecture of HCCP was characterized using mercury intrusion technique (Micromeritics Instrument Corporation, Norcross, GA, USA) and exhibited a mean porosity range of 50-500 µm pore size. HCCP disks (7 mm×5 mm), granules (2 mm×5 mm), and cubes (1 cm$^3$) were prepared as described previously. For in vivo applications, HCCP was sterilized by autoclaving prior to use.

Quantitative rhBMP-2 Binding Affinity Assay: HCCP cubes (1 cm$^3$, N=5) were incubated in PBS containing rhBMP-2 (R&D Systems, Minneapolis, MN, USA) at 1 µg/mL. Samples of solution surrounding HCCP cubes were collected at 5 minutes ("load" samples). HCCP was transferred and submerged in fresh phosphate buffered-saline (PBS, Gibco, Life Technologies, Carlsbad, CA, USA) and a sample of the PBS surrounding the HCCP was collected after 30 minutes. Likewise, for successive timepoints (30 minutes, 16 hours, 40 hours, and 64 hours), HCCP was transferred and submerged in new PBS, and sample were collected at each time point.

Samples were diluted 50-fold in PBS and assayed for residual rhBMP-2 leached into each wash by ELISA. PBS and 1 µg/mL rhBMP-2 solution (not incubated with HCCP) were used as controls. Two independent ELISA assays were performed to assess the ability of HCCP to retain rhBMP-2. The first assay utilized a sandwich (2,2'-azino-bis) ABTS ELISA kit (Peprotech, Rocky Hill, NJ, USA) for the absorbance readings. An ELISA plate was primed with capture antibody overnight according to kit manufacturer's procedures. On the following day, the plate was washed 4 times in 0.05% Tween-20 in PBS (wash buffer), and blocked with 1% bovine serum albumin (BSA, Gibco, Life Technologies, Carlsbad, CA, USA) in PBS for one hour to prevent non-specific binding. Plate was then washed 4 times using wash buffer.

The second ELISA assayed for rhBMP-2 retention on HCCP after 30 minutes. HCCP cubes (1 cm$^3$, N=3) were incubated in 1 ml of PBS containing rhBMP-2 at 1 µg/ml. After 30 minutes, HCCP cubes were removed from the rhBMP-2 solutions, wringed of excess solution, and the residual concentration of rhBMP-2 solution was diluted 500-fold and quantified using ELISA according to the manufacturer's instructions (ThermoFisher, Waltham, MA, USA). PBS and 1 µg/mL rhBMP-2 solution (not incubated with HCCP) were used as controls.

Visualization of rhBMP-2 Retention: Bone marrow aspirate (BMA) was collected from a male New Zealand White rabbit (4.0 kg, >6 months of age) under sedation and aseptic conditions. All surgical and animal care procedures were approved by the Institutional Animal Care and Use Committee (Protocol #MM-007102). A 22 G spinal needle primed with a sterile 10% solution of 0.5 M ethylenediaminetetraacetic acid (EDTA, Gibco, Life Technologies, Carlsbad, CA, USA) was used to aspirate up to 3 mL bone marrow from the femur. BMA was collected in sterile 5 mL tubes containing tripotassium-EDTA. HCCP disks (7 mm×5 mm, N=3) were incubated in a 24-well plate containing PBS with 1 µg/mL of rhBMP-2 overnight. HCCP discs were also incubated in bone marrow spiked with 1 µg/mL of rhBMP-2. PBS and bone marrow without rhBMP-2 were used as controls. HCCP disks were then removed from the wells, rinsed three times with 1 mL PBS, and incubated with primary mouse anti-human BMP-2 antibody (1 µg/mL) (Abcam, Cambridge, MA, USA). After 1 hour, HCCP disks were washed thoroughly in PBS and stained using 3,3-Diaminobenzidine (DAB) kit (R&D Systems, Minneapolis, MN, USA). Images of stained HCCP disk were uploaded to ImageJ (National Institute of Health, Bethesda, MD, USA) and signal for rhBMP-2 was determined measuring pixel intensity. RGB images of stained HCCP discs were taken against a white background. The images were converted to 32-bit grayscale in ImageJ and inverted. For each image, a region of interest (ROI) was drawn around the disc that excluded shadows at the periphery. The mean pixel intensity values were measured for each selection. To account for the differences in lighting between the images, the mean pixel intensity value of the background was subtracted from mean intensity of the HCCP disc.

Binding Affinity of Endogenous BMP-2 to HCCP: An established critical-sized bone defect model in New Zealand White (NZW) rabbits was used to investigate whether endogenous BMP-2 showed binding affinity to HCCP in vivo. All surgical and animal care procedures were approved by the Institutional Animal Care and Use Committee (Protocol #MM-003828). Male NZW rabbits (N=6, 4.0 kg (±0.5), 13 months of age) were sedated using a ketamine-midazolam mixture (20 mg/kg; 2 mg/kg) and anesthetized using isoflurane (>5%). Left and right femurs were clipped and disinfected with povidone iodine and 70% ethanol solution. Lateral femoral condyles were accessed by incising and dissecting the skin, superficial fascia, and deep fascia. A 2 mm high-speed burr (Medtronic, Minneapolis, MN, USA) was used to create a 7 mm diameter×10 mm depth cylindrical defect bilaterally and approximately 1 cc granules of HCCP (2 mm×5 mm granules) was implanted into each defect. Implantation sites were sealed with bone wax, sutured with 4-0 absorbable PDS-II suture (Ethicon, Somerville, NJ, USA), and patched with surgical staples. Rabbits were treated with antibiotics and analgesics for three days postoperatively and clinical observations were conducted daily for the duration of the study. HCCP was harvested from animals at 2 weeks (N=3) and 4 weeks (N=3) after euthanasia using a sodium pentobarbital and sodium phenytoin solution.

Immunostaining: HCCP explants were fixed in 10% formalin for at least 24 hours then transferred to 70% ethanol for embedding in paraffin (VDX Veterinary Diagnostics, Davis, CA USA). Sections (5 µm) were deparaffinized in Formula 83 (CBG Biotech, Solon, OH, USA) and rehydrated in decreasing concentrations of absolute ethanol finishing with PBS. Slides were incubated with serum blocking reagent provided by DAB staining kit (R&D Systems, Minneapolis, MN, USA), incubated with 1 µg/mL of primary mouse BMP-2 antibody (Abcam, Cambridge, MA, USA) for 1 hour, washed in PBS, then stained for presence of endogenous BMP-2 using the same DAB staining kit and finally mounted with MM83 mounting medium (CBG Biotech, Solon, OH, USA).

Statistical Analysis: Results are reported as the mean±standard error of the mean and calculated using Microsoft Excel (Microsoft, Redmond, WA, USA). Statistical significance (p<0.05) was determined by analysis of variance or two-sided Student's t-test analysis. Statistics on image densitometry data used a Welch's t-test, performed in excel.

Results

Figure 4:
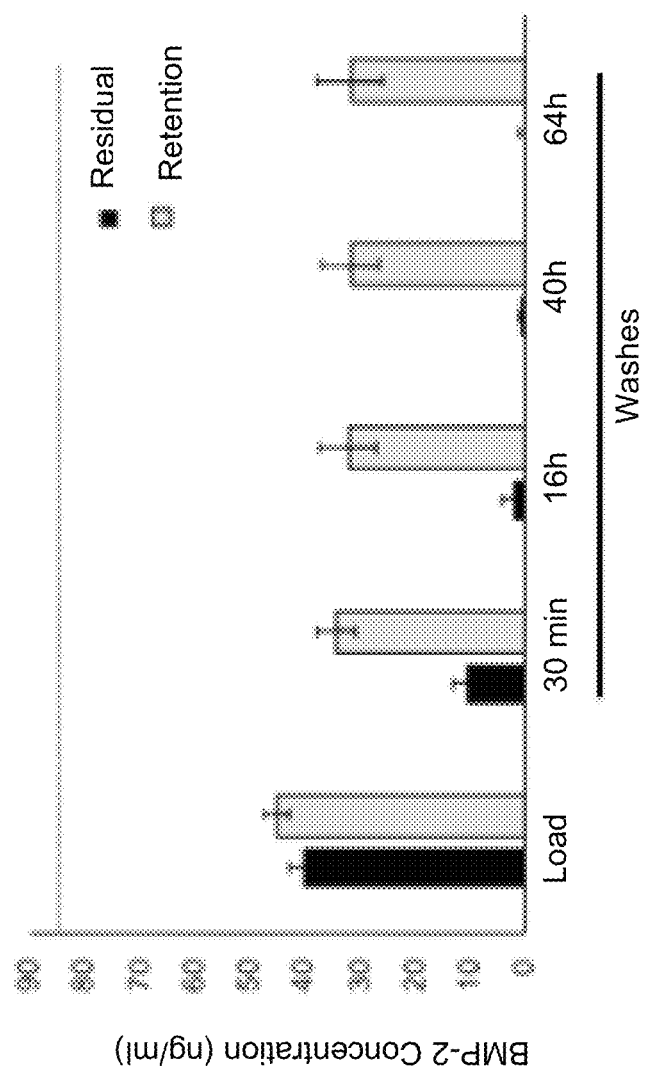
FIG. 4 shows the time course of rhBMP-2 retention in HCCP by indirect assay. HCCP scaffolds were incubated in BMP-2 solution for 5 minutes (load), then washed for 30 minutes, 16, 40, and 64 hours. Concentration of residual rhBMP-2 in solution was measured via ELISA (black bars). Retention of rhBMP-2 by the scaffold was calculated by subtracting the cumulative residual concentrations of rhBMP-2 from the baseline (dotted line) stock solution concentration. Error bars represent standard error of the mean (N=5 experimental replicates).
Figure 5:
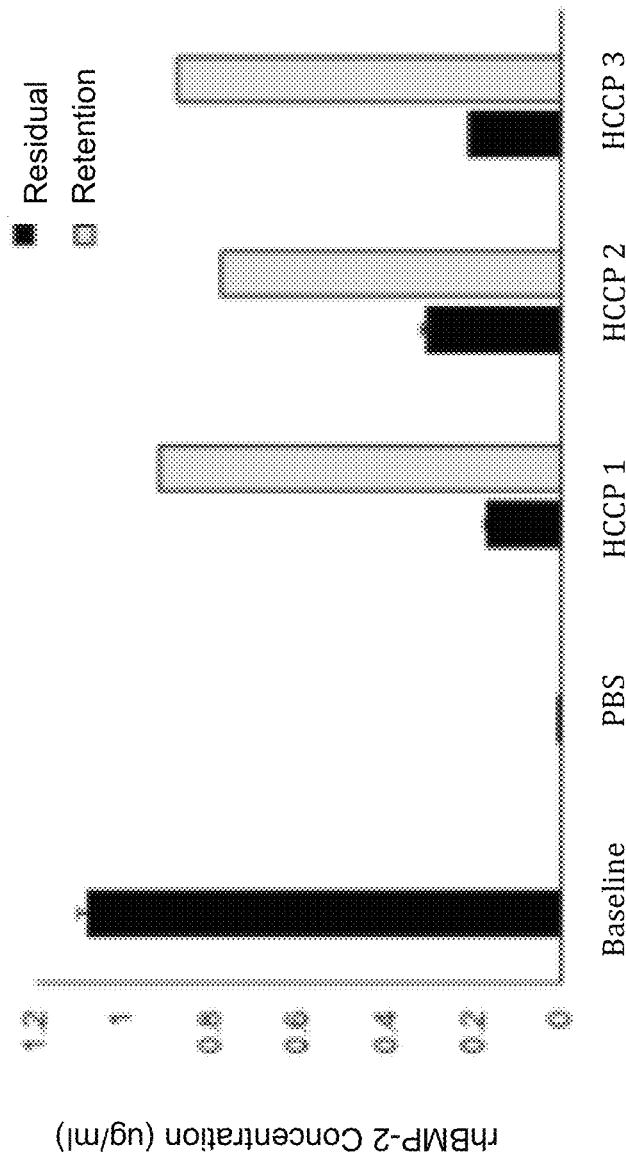
FIG. 5 shows the indirect assay of rhBMP-2 retention by HCCP. HCCP scaffolds were placed in rhBMP-2 solution and incubated for 30 minutes. rhBMP-2 residual (black bars) represents the concentration of rhBMP-2 remaining in solution after incubation with HCCP. Baseline control is the stock solution of rhBMP-2 without incubation in presence of HCCP; PBS was used as a negative control (error bars represent standard error of the mean; N=12 technical replicates in ELISA assay). Grey bars represent calculated BMP-2 retention in the scaffold by subtracting the mean "residual" from the mean "baseline" concentration (N=3 experimental replicates, denoted HCCP 1, 2, 3).

Retention of rhBMP-2 by HCCP: To indirectly analyze the retention profile of rhBMP-2 loaded HCCP, an ELISA was performed in two independent assays. The first ELISA assay analyzed rhBMP-2 retained by HCCP over a 64-hour duration (FIG. 4). The second ELISA assay had 3 independent HCCP cubes loaded with rhBMP-2; retention was assayed after 30 minutes (FIG. 5). Both ELISA assays indicate a decrease in the amount of rhBMP-2 detectable in solution of rhBMP-2 after incubation with HCCP. HCCP was found to have retained 286 ng rhBMP-2/g HCCP with 90% confidence interval [159, 418] and 95% confidence interval [129, 449].

FIG. 4 shows that the HCCP scaffolds were found to have an average of 44.91 ng/mL rhBMP-2 retention after incubating the scaffolds in BMP-2 solution. After the HCCP scaffold with rhBMP-2 loaded went through a PBS wash for 30 minutes, it was found to have retained an average of 34.22 ng/mL of rhBMP-2. After a 16 hour PBS wash, the average amount of rhBMP-2 retained in the scaffold was 32.11 ng/mL. After a 40 hour PBS wash, the average amount of rhBMP-2 retained in the scaffold was 31.65 ng/mL. After a 60 hour PBS wash, the average amount of rhBMP-2 retained in the scaffold was 31.61 ng/mL. This data provides evidence that HCCP scaffold does retain rhBMP-2.

In addition, FIG. 5 shows that the baseline control had 1.08 µg/mL of rhBMP-2 remaining in solution after incubation of HCCP with no retention of rhBMP-2 in the scaffold. The PBS solution, used as a negative control, had no rhBMP-2 in solution nor the scaffold. HCCP 1 had 0.17 µg/mL of rhBMP-2 remaining in solution after incubation of HCCP with 0.91 µg/mL of rhBMP-2 retained in the scaffold. HCCP 2 had 0.31 µg/mL of rhBMP-2 remaining in solution after incubation of HCCP with 0.77 µg/mL of rhBMP-2 retained in the scaffold. HCCP 3 had 0.21 µg/mL of rhBMP-2 remaining in solution after incubation of HCCP with 0.87 µg/mL of rhBMP-2 retained in the scaffold.

Figure 6:
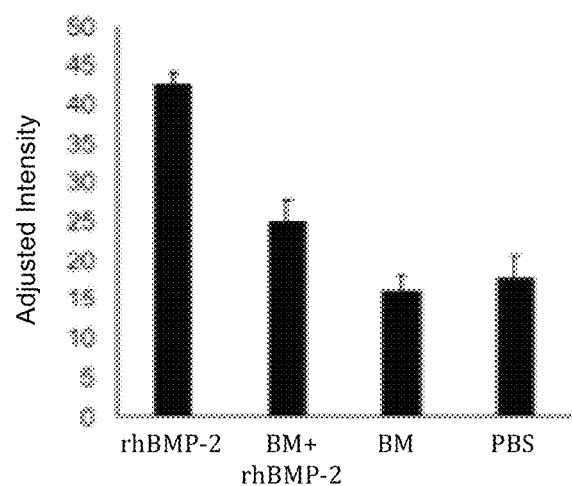
FIG. 6 shows the direct assay of rhBMP-2 retention by HCCP. HCCP disks were incubated overnight in rhBMP-2 solution (rhBMP-2; 1 µg/ml), bone marrow (BM), bone marrow plus rhBMP-2 (BM+rhBMP-2), or in PBS, then rinsed, and stained with an anti-BMP-2 antibody. Secondary DAB staining indicates the presence of rhbmp-2 as a dark brown color. Three experimental replicates were performed for each condition. Densitometric analysis shows significantly higher DAB signal in the rhBMP-2 treated group compared to all other groups (B).

Direct assay of rhBMP-2 retention by HCCP: In order to provide direct evidence of the ability of HCCP to bind and retain rhBMP-2, HCCP discs were loaded with rhBMP-2, followed by 3 washes in PBS and immunostained with an anti-BMP-2 antibody. Presence of rhBMP-2 was detected colorimetrically using a DAB secondary. HCCP soaked in rhBMP-2 showed high DAB signal, whereas control disks showed minimal detection (FIG. 6). HCCP discs incubated overnight in rhBMP-2 solution had an adjusted intensity of 42.73 pixel intensity. HCCP disks incubated overnight in bone marrow and rhBMP-2 had an adjusted intensity of 24.93 pixel intensity; HCCP in bone marrow alone had 16.02 pixel intensity; HCCP in PBS had 17.67 pixel intensity. This data provides direct evidence of the statistically significant difference in image intensities for PBS control vs. rhBMP-2 loaded HCCP (17.7±5.37 vs. 42.7±2.74 mean pixel intensity, p-value 0.003).

Figure 7:
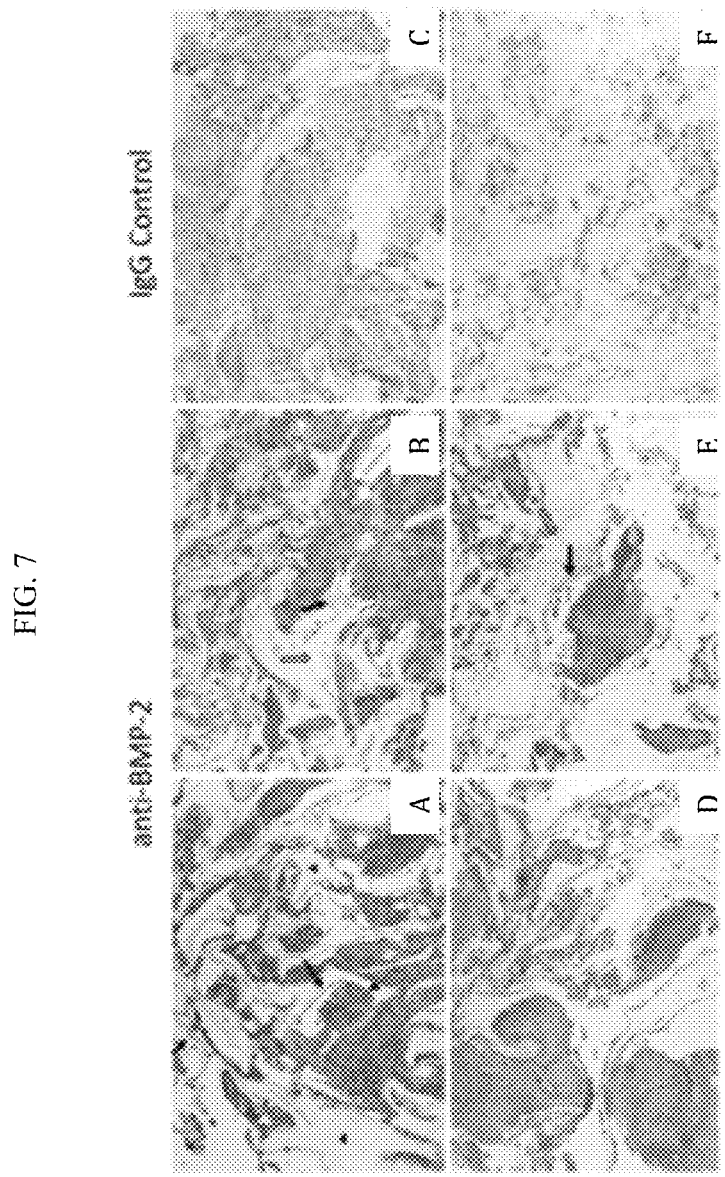
FIG. 7 shows the binding of endogenous BMP-2 to HCCP in scaffold explants. 5 µm paraffin sections were stained with anti-BMP-2 antibody and 3,3'-Diaminobenzidine for colorimetric visualization of endogenous BMP-2. The figure shows positive brown precipitate at 2 weeks (a, b) and 4 week (d, e) time intervals. Rabbit IgG controls were used for (c) 2 weeks and (f) 4 week time interval sections. The black triangle (a) identifies HCCP. Black solid arrows (a, b, e) identify positive brown stain along pores of HCCP. White arrows with black borders (b, e) identify unfilled HCCP pores with negative brown stain. Black dash arrow (a) identifies osteoblasts with a punctate morphology.

Detection of endogenous BMP-2 in HCCP: Next, the ability of HCCP to bind endogenous BMP-2 was evaluated by implantation of HCCP in femoral condyle of rabbits. Scaffolds were explanted at 2 and 4 weeks, processed and stained for the detection of endogenous BMP-2 (FIG. 7). Serial 5 µm sections taken from multiple locations throughout the tissue block sample showed presence of endogenous BMP-2 deposition along the walls of the pores. Numerous cells expressing BMP-2 were observed throughout the pores of HCCP. Rabbit IgG isotype controls showed minimal to no BMP-2 signal. Positive brown staining in FIG. 7 shows evidence of endogenous BMP-2 binding to HCCP in scaffold explants in addition to the formation of osteoblasts.

Discussion

The safety profile of HCCP and its versatile application as an osteoconductive bone graft substitute provide a promising vehicle to deliver rhBMP-2 in diverse clinical settings for bone regeneration and repair. BMP-2 localization on implant devices may be important for encouraging recruitment, proliferation, and differentiation of endogenous osteogenic stem and progenitor cells at the site of implantation. In our prior studies, HCCP was shown to bridge a critical defect in femoral condyle as early as 10 weeks in rabbits (Koleva et al. *BioResearch Open Access* 2019 8:111-120). The current study was performed to investigate the interaction between HCCP and BMP-2 and propose a potential mechanism of action. The results indicate a stable retention of rhBMP-2 in HCCP in vitro and deposition of endogenous BMP-2 in vivo on the surface of three-dimensional, porous HCCP structures. In addition, we have observed a large number of cells expressing BMP-2 within the pores of HCCP where BMP-2 is localized, suggesting that HCCP may gain osteoinductive properties post-implantation via binding of endogenous BMP-2 to the surface of the microstructure of HCCP.

The expression of BMP-2 is upregulated particularly in osteoblasts and vascular cells during endochondral healing, lamellar bone formation, or intramembranous healing after mechanical trauma or stimulus via autocrine and paracrine regulatory mechanisms. However, it has also been shown to result in numerous serious side effects including ectopic bone formation and inflammation in surrounding tissues (Robin et al. *Spine* 2010 35:1350-1354, Wong et al. The *Spine Journal* 2008 8:1011-1018), which suggest leakage of rhBMP-2 from the implant site. Interestingly, an earlier study published by Wyeth showed that a significant amount of 125I-rhBMP-2, delivered using collagen sponge, left the implant site (~50% at 24 hours, 68% at 7 days, >90% at 2 weeks post-implantation) (Geiger et al. *Advanced Drug Delivery Reviews* 2003 55:1613-1629), suggesting poor retention of 125I-rhBMP-2 in collagen and/or rapid degradation of the collagen carrier. Interestingly, doses below 100 µg (~100-fold lower than the current clinical dose) have been shown to enhance bone formation significantly when rhBMP-2 is delivered with poly (1-lactide-co-glycolide) acid (PLGA) fiber-reinforced, brushite-forming cement (CPC) in a recent study (Gunnella et al. *The Spine Journal*

2017 17:1699-1711). This observation may be resulted by better retention of rhBMP-2 at the implant site and/or slower degradation of the carrier.

Other synthetic polymers have also been investigated as a carrier for rhBMP-2 due to their chemical and mechanical properties as well as its ease of manufacture and sterilization (Wang et al. *Journal of Biomedical Nanotechnology* 2017 13:1446-1456). Examples of synthetic polymers include poly L-lactic acid (PLA), polyglycolic acid (PGA), and a combination of the two as PLGA. However, these polymers have been known to potentially elicit an inflammatory response when used in clinical settings (Anderson et al. *Advanced Drug Delivery Reviews* 1997 28:5-24, Ceonzo et al. *Tissue Engineering* 2007 12:301-308). Other disadvantages using synthetic polymers include decrease in local pH due to accumulation of by-products and limited biological function (Ceonzo et al. *Tissue Engineering* 2007 12:301-308). An alternative material to circumvent the limitations of other synthetics may be polysaccharide polymers, which have gained popularity due to its biocompatible, sustainable, and renewable characteristics (Wahab et al. *Composites from Renewable and Sustainable Materials* 2016). Polysaccharides are comprised of carbohydrate chains, which is a simplification of the composition of HCCP. Our investigations of HCCP demonstrate its promising potential as a novel polysaccharide delivery system for rhBMP-2 as evidenced by its ability to localize endogenous BMP-2 throughout its structure. In addition, HCCP has been shown to bridge a critical bone defect significantly more efficiently than PLGA (Koleva et al. *BioResearch Open Access* 2019 8:111-120) while maintaining radiolucency (radiopaque with bone formation), unlike mineralized/cement-based carriers.

Taken together, the localization of BMP-2 to HCCP may partially contribute to repair and regeneration of a critical-sized bone defect. It is also possible that other mechanical and chemical properties of HCCP may provide additional contributions to osteogenesis at the implant site. The binding affinity of BMP-2 to HCCP provides an additional opportunity for developing a more effective and safer alternative to absorbable collagen sponge.

Although the foregoing invention has been described in some detail by way of illustration and example for purposes of clarity of understanding, one of skill in the art will appreciate that certain changes and modifications may be practiced within the scope of the appended claims. Although particular features may be described herein with respect to certain embodiments, such features may be applied to any embodiment of the present invention. In addition, each reference provided herein is incorporated by reference in its entirety to the same extent as if each reference was individually incorporated by reference.

What is claimed is:

1. A method of preparing a glucomannan scaffold, the method comprising:
    freezing a glucomannan gel under freezing conditions that maintain the temperature of the glucomannan gel in the range of $-0.01°$ C. to $-3°$ C. for at least 100 minutes to induce a phase transition from gel to solid,
    wherein the glucomannan gel comprises about 1% to about 5% w/v glucomannan; and
    monitoring the temperature of the glucomannan gel during the phase transition to yield a glucomannan scaffold.

2. The method of claim 1, wherein the freezing conditions maintain the temperature of the glucomannan gel at its freezing point for at least 200 minutes.

3. The method of claim 2, wherein the freezing conditions maintain the temperature of the glucomannan gel at its freezing point for 250-1500 minutes.

4. The method of claim 1, wherein the freezing conditions comprise at least one freeze-thaw cycle to induce a phase transition from gel to solid.

5. The method of claim 4, comprising 2 to 4 freeze-thaw cycles.

6. The method of claim 1, wherein the glucomannan scaffold comprises a porous portion exhibiting a uniform pore size of about 100-500 µm.

7. The method of claim 1, wherein at least about 10% of the volume of the glucomannan gel yields a glucomannan scaffold having a porosity of at least about 50% and an interconnectivity of at least about 50%, and wherein the glucomannan gel has a surface area to volume ratio (SA:V) of 0.75 to 1.

8. The method of claim 1, further comprising neutralizing the glucomannan scaffold to a pH of about 7.

9. The method of claim 1, further comprising contacting the glucomannan scaffold with a cell culture medium and/or a cell adhesion promoter.

10. The method of claim 1, further comprising:
    a) subjecting a glucomannan gel or a glucomannan system in phase transition to cooling conditions from a temperature of about 25° C. to a temperature of about 4° C.;
    b) maintaining the temperature of the glucomannan gel at its freezing point to yield a glucomannan system in phase transition for at least about 10 minutes;
    c) subjecting the glucomannan system in phase transition to thawing conditions at a temperature of about 25° C.;
    d) optionally repeating steps a), b), and/or c).

11. The method of claim 1 further comprising implanting the scaffold into a patient in need thereof.

12. The method of claim 1, wherein the glucomannan gel has an initial volume of 100-5000 mL.

13. The method of claim 1, wherein the freezing conditions comprise a constant freezing temperature for about 1-5 hours.

14. The method of claim 13, further comprising at least one freeze-thaw cycle.

15. A method of preparing a glucomannan scaffold, the method comprising freezing a glucomannan gel under freezing conditions that maintain the temperature of the glucomannan gel at about $-0.8°$ C. for at least 100 minutes to induce a phase transition from gel to solid and to yield a glucomannan scaffold.

* * * * *